Patented Mar. 5, 1940

2,192,318

UNITED STATES PATENT OFFICE 2,192,318

DISPERSION OF SYNTHETIC POLYMERIC MATERIALS

James Emory Kirby, Wilmington, Del., assignor to E. I. du Pont de Nemours & Company, Wilmington, Del., a corporation of Delaware No Drawing. Application August 14, 1936, Serial No. 96,051

7 Claims. (Cl. 260—8)

This invention relates to the preparation of aqueous dispersions of halogen-2-butadienes-1,3 and their polymers. More particularly, it relates to the preparation of aqueous dispersions of halogen-2-butadienes-1,3 and their polymers in which dispersions the particles of the monomer or polymer bear a positive charge. Still more particularly the invention relates to the polymerization of halogen-2-butadienes-1,3 while they are dispersed in an aqueous acid medium in which their particles bear a positive charge. This application is a continuation-in-part of a copending application, Serial No. 572,739, filed November 2, 1931, now matured into U. S. Patent No. 2,076,949, granted April 13, 1937.

It has been discovered, as disclosed by Carothers and Collins in U. S. Patent No. 1,950,431, that hydrogen halides such as hydrogen chloride and hydrogen bromide may be made to combine with monovinylacetylene under suitable conditions with the formation of chloro-2-butadiene-1,3 and bromo-2-butadiene-1,3, respectively. Carothers and Collins have further disclosed in U. S. Patent No. 1,950,432 that chloro-2-butadiene-1,3 may be polymerized under a variety of conditions. A similar disclosure as regards bromo-2-butadiene-1,3 is found in U. S. Patent No. 1,950,433 of the same inventors.

It has also been disclosed by Collins in his U. S. Patent No. 1,967,861 that chloro-2-butadiene-1,3 is readily dispersed in an aqueous medium and polymerized in that state to yield an artificial latex from which a rubber-like material may be obtained. In this patent, Collins more particularly discloses that in certain cases even though the dispersion of chloro-2-butadiene-1,3 is alkaline before polymerization it may become acid (show a pH of less than 7) during the course of the polymerization due to the gradual liberation of acid. The particles of this acid dispersion have been found to bear a negative charge and the general instability of the latices in this condition greatly retards their value.

In none of these references, however, is there any disclosure of a method for preparing dispersions of chloro-2-butadiene-1,3 polymer in which the particles are positively charged. Such dispersions have been found to have very useful properties more fully set forth hereinafter.

It is, therefore, an object of this invention to prepare dispersions of halogen-2-butadienes-1,3 in an aqueous medium in which dispersions the particles of the halogenbutadiene bear a positive charge. A more specific object is to prepare dispersions of chloro-2-butadiene-1,3 in an aqueous medium in which dispersions the particles of chlorobutadiene bear a positive charge. A further object is to polymerize halogen-2-butadienes-1,3 while they are dispersed in aqueous media in which the particles of the dispersed halogenbutadiene bear a positive charge. A still further object is to prepare dispersions of halogen-2-butadiene-1,3 polymers in an aqueous medium in which dispersions the particles of polymer bear a positive charge. Another object is to prepare aqueous acid dispersions of halogen-2-butadiene-1,3 polymers and particularly of chloro-2-butadiene-1,3 polymers in which dispersions the polymer particles are positively charged and which dispersions are stable to added acid. Other objects will appear hereinafter.

It has now been found that these objects may be accomplished by dispersing a halogen-2-butadiene-1,3, for example, chloro-2-butadiene-1,3, in a suitable aqueous medium, for example, an aqueous acid solution of casein, and thereafter polymerizing the dispersed halogen-2-butadiene-1,3. It is also possible to prepare aqueous acid dispersions of halogen-2-butadiene-1,3 polymers, in which the particles of polymer are positively charged by adding dilute acid to an alkaline dispersion of a halogen-2-butadiene-1,3 polymer under conditions which render the dispersion relatively insensitive to coagulation by acid. Such conditions may be produced by adding a small amount of gelatin to the alkaline dispersion before adding the acid. The dispersed polymer particles in acid dispersions so prepared bear a positive charge even though the particles in the alkaline dispersions from which they are prepared bear a negative charge.

The following examples describe in detail methods for accomplishing the above objects, but it is to be understood that they are inserted merely for purposes of illustration and are not to be construed as limiting the scope of the invention.

Example I

One part of casein is dissolved in 52 parts of glacial acetic acid and 130 parts of water. Forty-six (46) parts of chloro-2-butadiene-1,3 are then dispersed in this solution with constant rapid stirring. A homogeneous emulsion results. In about two days at room temperature the polymerization is complete and a pure white, fine dispersion of chloro-2-butadiene-1,3 polymer is obtained.

Example II

Five parts of gelatin dissolved in 100 parts of water are added to 100 parts of an aqueous alkaline dispersion of chloro-2-butadiene-1,3 polymer of about 49% concentration. Enough acetic or sulfuric acid is then added to cause the latex to turn Congo test paper blue. The aqueous alkaline dispersion of chloro-2-butadiene-1,3 to which the gelatin and acid were added in this example was prepared with sodium oleate as the emulsifying agent.

The use of chloro-2-butadiene-1,3 in the above examples indicates the manner in which the invention may be applied. The invention is not limited to the use of chloro-2-butadiene-1,3 however, but is broadly applicable to halogen-2-butadienes-1,3. Thus bromo-2-butadiene-1,3 may be treated in the same manner as the chloro-derivative to yield aqueous acid dispersions.

In addition to the media illustrated in the above examples, the following are given as further illustrations of media in which the emulsified polymer particles carry a positive charge. The invention is not limited to the use of the specific aqueous media disclosed, however. Thus, the aqueous media disclosed in Examples I and II may be varied by substituting another acid for the acetic and sulfuric acids used. Hydrochloric and other hydrohalogen acids may, for example, be used. Moreover, as disclosed in a copending application of Dales and Downing, Serial No. 128,630, filed March 2, 1937, a wide variety of other dispersion media in which the halogenbutadiene polymer particles bear a positive charge are obtained by dissolving in water salts of inorganic acids and organic bases of high molecular weight.

Suitable proportions of casein or gelatin, for example, are indicated by the above examples. The invention is not limited to the particular proportions given in the examples. It is possible to obtain satisfactory results with somewhat less amounts as well as with greater amounts. The acidity of the dispersion media illustrated above may vary but should not be too great since this develops a tendency to instability. A preferred acidity is that obtained with the proportions of ingredients used in Example I. In its broad scope, moreover, the invention is not limited to dispersion media of any particular hydrogen ion conceneration but includes both acid and alkaline dispersions.

The concentrations of the halogen-2-butadienes-1,3, particularly the chloro-derivative, which may be used, will vary widely from those given in the above examples. About 20% of chloro-2-butadiene-1,3 as used in Example I gives good results but greater or lesser concentrations are operable.

The dispersion is preferably prepared by passing the chloro-2-butadiene-1,3 into the dispersion medium slowly with rapid stirring. Other means for preparing dispersions, familiar to the art, may be used, however.

Polymerization proceeds spontaneously in the absence of inhibitors and is generally complete in about two days. This rate may be increased by the use of catalysts such as air, oxygen, heat, pressure, etc. as desired.

When polymerization is complete a fine, pure white dispersion results in most cases. A similar dispersion is obtained by the method of Example II, which is likewise susceptible of wide variation. Furthermore, a wide variety of alkaline or neutral halogen-2-butadiene-1,3 polymer latices can be thus converted to acid latices, for example, dispersions made with emulsifying agents, such as salts of alkyl naphthalene sulfonic acids and the like.

The aqueous dispersions of the polymer, obtained by the process of this invention may be used, as such, directly for the preparation of a wide variety of articles. If desired an antioxidant such as catechol, pyrogallol, or eugenol may be added. They may also be compounded and coagulated by various means in the form of films or shaped articles as, for example, by extrusion into a coagulating bath or by the method disclosed in copending application Serial No. 572,739, mentioned above, which involves dipping a form into the latex and then coagulating the film so formed. In general, the art relating to the formation of useful articles from latices of natural rubber may be applied to the latices obtained by the process of this invention.

Thus many of these aqueous polymer dispersions may be coagulated by strong electrolytes, such as solutions of sodium chloride, sodium sulfate or calcium chloride or by organic solvents miscible with water but which are not solvents for the polymer, for example, ethanol, methanol, acetone, etc. It is also possible to coagulate some of the acid dispersions with alkali. Some dispersions coagulate, of course, more readily than others depending upon their stability. Suitable means for coagulating a particular dispersion will be apparent to those skilled in the art. Rubber-like products of predetermined shape may be prepared by evaporating the dispersion on the surface of forms or with the aid of suction on porous forms.

As disclosed above, the dispersed particles of polymer show a positive charge in the dispersions of this invention. In this, these dispersions are novel as well as peculiarly useful. The fact that the dispersed particles do carry a positive charge can be readily demonstrated by passing a direct electric current through a small portion of the dispersion which can be viewed through a microscope. It will be noted that the particles migrate toward the negatively charged electrode.

The presence of the positive charge on the particles not only makes it possible to incorporate certain compounding ingredients, such as alumina, which are difficult to incorporate in negatively charged latices but in addition makes it possible to produlce mutual coagulation on forms by bringing these latices into contact with negatively charged latices. In addition, acid latices made by the process of the above examples may be mutually coagulated with alkaline latices. In some cases, these latices show improved wetting properties particularly on glass. Many other uses and advantages accruing from the inherent properties of these latices will be apparent to those skilled in the art.

It is apparent that many widely different embodiments of this invention may be made without departing from the spirit and scope thereof and therefore it is not intended to be limited except as indicated in the appended claims.

I claim:

1. An aqueous dispersion of a halogen-2-butadiene-1,3 in which the dispersed particles carry a positive charge.

2. An aqueous acid dispersion of chloro-2-butadiene-1,3 in which the dispersed particles carry a positive charge.

3. An aqueous dispersion of a polymer of a halogen-2-butadiene-1,3 in which the particles of polymer carry a positive charge.

4. An aqueous dispersion of a polymer of chloro-2-butadiene-1,3 in which the particles of polymer carry a positive charge.

5. An aqueous acid dispersion of a polymer of chloro-2-butadiene-1,3 in which the particles of polymer carry a positive charge.

6. An aqueous acid dispersion of a polymer of chloro-2-butadiene-1,3 containing an amount of gelatin such that the ratio of gelatin to chloro-2-butadiene-1,3 is between 1:46 and 5:49 in which dispersion the particles of polymer carry a positive charge.

7. An aqueous acid dispersion of a polymer of chloro-2-butadiene-1,3 containing an amount of casein such that the ratio of casein to chloro-2-butadiene-1,3 is between 1:46 and 5:49 in which dispersion the particles of polymer carry a positive charge.

JAMES EMORY KIRBY.